United States Patent
Kucera et al.

(10) Patent No.: US 8,979,970 B2
(45) Date of Patent: Mar. 17, 2015

(54) FERTILIZER COMPOSITION INCORPORATING FIBROUS MATERIAL FOR ENHANCED PARTICLE INTEGRITY

(75) Inventors: Paul Kucera, Valrico, FL (US); W. Gregory Sawyer, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 13/430,157

(22) Filed: Mar. 26, 2012

(65) Prior Publication Data

US 2012/0285211 A1 Nov. 15, 2012

Related U.S. Application Data

(60) Provisional application No. 61/467,001, filed on Mar. 24, 2011.

(51) Int. Cl.
| | |
|---|---|
| *C05B 7/00* | (2006.01) |
| *C05B 17/00* | (2006.01) |
| *C05B 17/02* | (2006.01) |
| *C05B 1/00* | (2006.01) |
| *C05C 3/00* | (2006.01) |
| *C05D 9/02* | (2006.01) |
| *C05G 3/00* | (2006.01) |

(52) U.S. Cl.
CPC ... *C05B 1/00* (2013.01); *C05B 7/00* (2013.01); *C05C 3/00* (2013.01); *C05D 9/02* (2013.01); *C05G 3/0041* (2013.01)
USPC ........................................ 71/33; 71/34; 71/48

(58) Field of Classification Search
USPC ....................................................... 71/33–63
See application file for complete search history.

(56) References Cited

U.S. PATENT DOCUMENTS

| | | | | |
|---|---|---|---|---|
| 3,163,517 | A * | 12/1964 | May et al. | 71/26 |
| 3,730,700 | A * | 5/1973 | Groenveld | 71/34 |
| 4,857,098 | A * | 8/1989 | Shirley, Jr. | 71/28 |
| 5,328,497 | A | 7/1994 | Hazlett | |
| 5,360,465 | A | 11/1994 | Buchholz et al. | |
| 5,984,992 | A * | 11/1999 | Greer et al. | 71/11 |
| 6,159,263 | A * | 12/2000 | Greer et al. | 71/11 |
| 6,207,729 | B1 | 3/2001 | Medoff et al. | |
| 6,544,313 | B2 * | 4/2003 | Peacock et al. | 71/28 |
| 6,758,879 | B2 * | 7/2004 | Greer et al. | 71/11 |
| 7,018,821 | B2 | 3/2006 | Becker et al. | |
| 7,128,880 | B2 * | 10/2006 | Dahms et al. | 422/129 |

(Continued)

OTHER PUBLICATIONS

Frick, John O., "Petroleum Based DCA's to Control Fugitive Dust," Proceedings of the Annual Meeting of the Fertilizer Industry Round Table, Series 27, circa 1977, pp. 94-96.

(Continued)

*Primary Examiner* — Wayne Langel
(74) *Attorney, Agent, or Firm* — Thomas Horstemeyer, LLP

(57) ABSTRACT

Fertilizer granules and methods of producing fertilizer granules. The fertilizer granules are formed from a fertilizer composition, such as a phosphate fertilizer, includes a fibrous material for the purpose of increasing the granule strength preventing or reducing attrition or dusting formation during storage, transport, and/or handling of the fertilizer. Dust formation can be reduced fifty percent or more. The base fertilizer composition can include a phosphate fertilizer, such as monoammonium phosphate (MAP) or diammonium phosphate (DAP), and optionally one or more micronutrients or secondary nutrients, such as elemental sulfur. The fibrous material is pulp or paper sludge, for example.

20 Claims, 2 Drawing Sheets

(56) References Cited

U.S. PATENT DOCUMENTS

| | | | |
|---|---|---|---|
| 7,497,891 B2* | 3/2009 | Peacock | 71/33 |
| 7,615,093 B2 | 11/2009 | Pildysh | |
| 7,704,595 B2 | 4/2010 | Morin | |
| 7,867,947 B1* | 1/2011 | Devic et al. | 504/101 |
| 2005/0279146 A1 | 12/2005 | Greer et al. | |
| 2006/0142157 A1 | 6/2006 | Birthisel et al. | |
| 2007/0021305 A1 | 1/2007 | Baker | |
| 2012/0272700 A1* | 11/2012 | Nevin | 71/12 |
| 2013/0213102 A1* | 8/2013 | Lynch et al. | 71/13 |

OTHER PUBLICATIONS

MicroEssentials website printout, http://www.microessentials.com/, 2012, 1 page.

MicroEssentials MES10 Product Brochure & MSDS and Spec Sheet, Dec. 22, 2009, 8 pages.

PCT Search Report dated Oct. 31, 2012 for PCT Application No. PCT/US2012/030311, 11 pages.

Office Action dated Jul. 1, 2014 for CN Application No. 201280014724.0 filed Mar. 23, 2012, 9 pages.

* cited by examiner

FERTILIZER COMPOSITION INCORPORATING FIBROUS MATERIAL FOR ENHANCED PARTICLE INTEGRITY

RELATED APPLICATION

The present application claims the benefit of U.S. Provisional Application No. 61/467,001 entitled "FERTILIZER COMPOSITION INCORPORATING FIBROUS MATERIAL FOR ENHANCED PARTICLE INTEGRITY," filed Mar. 24, 2011, which is hereby incorporated by reference in its entirety.

FIELD OF THE INVENTION

The invention relates generally to fertilizer compositions. More particularly, the invention relates to a fertilizer composition incorporating a fibrous material for increased granule strength and to reduce attrition or dust formation during storage and handling.

BACKGROUND OF THE INVENTION

Methods for the manufacture of fertilizers into particles via granulating, compaction, or other techniques are well known. The resulting fertilizers often contain an undesirable level of particles fine enough to become airborne dust. This dust is produced during the manufacture, storage and transportation of the fertilizer particles from the mechanical abrasion encountered during movement of the fertilizer particles, continued chemical reactions or curing processes after the initial particle formation, the action of moisture migration through the fertilizer during storage, and/or temperature and humidity conditions during handling and storage.

Fertilizer dust can pose safety, health, and/or environmental problems. For example, inhalation of certain fertilizer dust may pose health concerns. It can also potentially contribute to the contamination of surface water ecosystems. The generation or build-up of excessive dust in manufacturing, storage, and/or transportation facilities can also be potentially explosive if ignored. Fertilizer dust can also be a concern from an economic standpoint when fertilizer dust becomes airborne as it leads to the loss of agronomic and economic value.

Attempts have been made to control or reduce dust formation of fertilizers during storage and handling. One example includes the use of oils, waxes, blends of oil and wax, and emulsions based on these products. For example, it has been suggested that petroleum based products be used to control dust from agricultural fertilizers. See, for example, Frick, "Petroleum Based DCA's to Control Fugitive Dust," Proceedings of the Annual Meeting of the Fertilizer Industry Round Table, Series 27, pages 94-96. However there are disadvantages involved in using these treatment methods. Over time oils tend to volatilize and/or be adsorbed into the fertilizer particle, resulting in loss of or decreased effectiveness. Waxes are also ineffective and difficult to handle because they absorb into the fertilizer particle at temperatures above their melt point and do not spread or coat the fertilizer particle surface at temperatures below their melt point. In addition, both oils and waxes have limited binding properties that are essential for long term fertilizer dust control.

Other proposed dust control methods include application of other liquids such as lignosulfonate solutions, molasses solutions, urea solutions, mixtures of these solutions, other fertilizer solutions, amines, surfactants, polymers and even water. See, for example, U.S. Pat. No. 5,360,465 to Buckholtz et al. and U.S. Pat. No. 5,328,497 to Hazlett. However, due to the water present, aqueous solutions and emulsions can accelerate the formation of fertilizer dust and exacerbate the fertilizer particles caking tendencies. These treatments also tend to lose their binding properties as the solutions and emulsions dry, thereby becoming ineffective as long term dust control agents.

Some commercially available fertilizers incorporate micronutrients into the base fertilizer for enhanced agronomic benefits. One such product is the MicroEssentials® line of fertilizers that incorporate elemental sulfur into a phosphate fertilizer base composition. However, the elemental sulfur does not bond with the underlying monoammounium phosphate (MAP) based fertilizer formulation, and is thereby prone to attrition and dust formation during storage and handling of these fertilizer granules.

There remains a need for a fertilizer granule having enhanced particle integrity that is efficient and economic to manufacture, and which prevents or reduces dust formation during storage and handling of the granules.

SUMMARY OF THE INVENTION

According to embodiments of the invention, fertilizer granules formed from a fertilizer composition, such as a phosphate fertilizer, includes a fibrous material for the purpose of increasing the granule strength preventing or reducing attrition or dusting formation during storage, transport, and/or handling of the fertilizer. In one embodiment, the dust formation is reduced fifty percent or more.

The base fertilizer composition can comprise a phosphate fertilizer, such as monoammonium phosphate (MAP) or diammonium phosphate (DAP), and optionally one or more micronutrients, such as zinc, and/or one or more secondary nutrients, such as elemental sulfur. The fibrous material can comprise pulp or paper sludge, for example.

In one embodiment of the invention, the fibrous material is added to a granulation process, such as those described in U.S. Pat. Nos. 7,497,891 and 6,544,313, both of which are incorporated herein by reference in their entireties, in the form of a pre-neutralized slurry such that the fibrous material is present in the final fertilizer composition in an amount from about 0.01 to about ten weight percent of the fertilizer composition, and more particularly from about 0.5 to about three weight percent of the fertilizer composition.

The above summary of the invention is not intended to describe each illustrated embodiment or every implementation of the present invention. The figures and the detailed description that follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
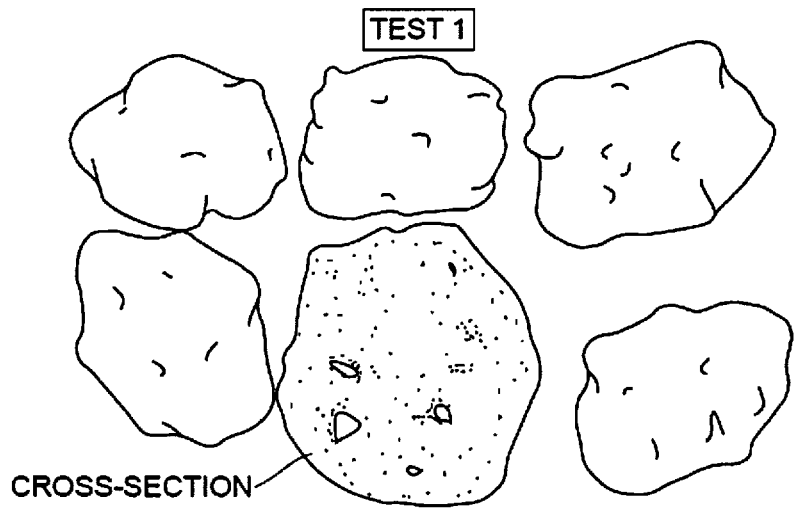
FIG. 1 is a photograph of granules of the baseline product containing no fiber material.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The fertilizer granules according to embodiments of the invention generally comprise a fertilizer base composition, optional secondary or micronutrients, and a fibrous material. In one embodiment of the invention, the fertilizer base composition comprises a phosphate composition such as, for example, ammonium phosphates, single superphosphate, and/or triple superphosphates, in combination with one or more secondary and/or micronutrients. In one particular embodiment, the fertilizer base composition comprises an ammonium phosphate fertilizer composition, such as MAP, DAP, or combinations thereof. Such ammonium phosphate fertilizer compositions can be produced by reacting phosphoric acid ($H_3PO_4$) with ammonia ($NH_3$) in an exothermic reaction. MAP or DAP can be produce according to the following reactions, depending on the ratio of the two reactants:

$$NH_3 + H_3PO_4 \rightarrow (NH_4)H_2PO_4 \text{ (MAP)}$$

$$2NH_3 + H_3PO_4 \rightarrow (NH_4)_2HPO_4 \text{ (DAP)}$$

Secondary nutrients can include, for example, one or more of calcium (Ca), sulfur (S), and magnesium (Mg). Secondary nutrient(s) can be present in an amount of from about 0.1 to about 50 weight percent of the fertilizer composition, more particularly less than about 20 weight percent, and even more particularly less than about 10 weight percent.

Micronutrients can include, for example, one or more of boron (B), copper (Cu), iron (Fe), manganese (Mn), molybdenum (Mo), zinc (Zn), chlorine (Cl), cobalt (Co), sodium (Na), and combinations thereof. Micronutrient(s) can be present in an amount of about 0.01 to about 5 weight percent of the fertilizer composition, more particularly about 0.1 to about 3 weight percent, and more particularly about 0.1 to about 1.5 weight percent. The micronutrients can be evenly distributed throughout the fertilizer such that a small amount of the micronutrient can be uniformly delivered to the plants being fertilized.

Two exemplary methods of producing fertilizers with micronutrients and/or secondary nutrients are described in U.S. Pat. Nos. 7,497,891 and 6,544,313, previously incorporated by reference in their entireties. For example, as discussed in U.S. Pat. No. 7,497,891, a pre-neutralizer is supplied with phosphoric acid and ammonia to produce a slurry of ammonium phosphate. A fibrous material is added to the slurry. Either MAP or DAP or a combination of the two may be produced in the pre-neutralizer depending on the ratio of ammonia and phosphoric acid. The ammonium phosphate produced in the pre-neutralizer is supplied to a granulator. The granulator is also supplied with ammonia from an ammonia sparger. The ammonia emitted from the ammonia sparger completes the ammonium phosphate reaction. The reaction is therefore a forward titration reaction.

In embodiments, a micronutrient can be added to the phosphoric acid to produce an enriched acid to be subsequently reacted with ammonia to produce the MAP or DAP containing the micronutrients, as described in U.S. Pat. No. 7,497,891. Additionally or alternatively, elemental sulfur can be applied, such as by spraying, onto fertilizer particles that are then coated or sprayed with a slurry containing fertilizer or precursor thereof, and subsequently cured to form sulfur-containing particles, as described in U.S. Pat. No. 6,544,313. Additionally or alternatively, the fertilizer composition can include one or more sulfates (e.g. calcium sulfate, magnesium sulfate, ammonium sulfate, or combinations thereof).

In alternative embodiments of the invention, the fertilizer composition can comprise, for example, nitrates, ureas, potashes, or combinations thereof, with or without phosphate fertilizers.

The fibrous material can comprise any of a variety of biodegradable fibrous materials, including, but not limited to cellulosic fibers from pulp or paper sludge. In addition to the pulp or paper sludge fiber, or alternatively to them, the fibrous material can include one or more of vegetable fibers like sugar beet, sugar cane, citrus pulp, grain, and/or potato, wood flour, peat moss, composted organic materials, manures, cotton, straw, brewers condensed solubles, lignosulfonate, sodium carbonate lignin, cane molasses, beet syrup, beet molasses, whey starch, soy solubles, corn cob, rice hulls, peanut hulls, ground wheat straw flour, wheat flour, soy flour, cellulose derivates, cellulose-based polymer binders, seed meal, feather meal, soy meal, humic acid, animal waste, activated sludge, and hydrolyzed animal hair.

When pulp or paper sludge is used, it can include any primary pulp or paper sludge generated by a sulfate, sulfite, de-inked, mechanical or semi-chemical pulping process either alone or in combination with a secondary sludge generated by a sulfate, sulfite, de-inked, mechanical or semi-chemical pulping process. One particular sludge is primary de-inked sludge. Primary de-inked sludge is the waste material produced from paper mills which use waste paper both pre- and post-consumer, newsprint and other papers as feedstock. This sludge has a content of about 40%-90% fiber and about 10%-60% filler (e.g. kaolin clay, barytes, calcium carbonate, titanium dioxide, other plant fibers, etc.).

An optional binding agent can be included to aid in bonding the fibrous material to the base composition and/or the optional secondary or micronutrients, if present. The invention is more fully detailed in the following sample preparation and test results.

EXAMPLES

The particle integrity of a commercially available phosphate fertilizer was compared to test compositions in which a different fibrous material was added to each test batch. The base formulation comprised a MAP fertilizer containing elemental sulfur, commercially available as MicroEssential's MES10 product, the product brochure and Material Safety Data Sheet (MSDS) available at http://www.microessentials.com/images/dynImages/MES-S10-brochure.pdf, and http://www.microessentials.com/images/dynImages/Micro-Essentials_S10__2.pdf, respectively, both of which are incorporated herein by reference in their entireties. The MES10 product comprises the formula $(NH_4)H_2PO_4+(NH_4)_2SO_4+S$, and has a composition comprising 40 weight % phosphate as $P_2O_5$, 12 weight % of nitrogen as N, about 0.5-2 weight % of water, about 5.0 weight % of sulfur as S, about 5.0 weight % of ammonium sulfate as S, and about 2-4 weight % of fluorides as F, according to the MSDS. The molecular weight of the pure material is 115.0 of MAP, 132.0 of ammonium sulfate, and 32.0 of sulfur, and the pH is about 4.2 to about 5.0 in a 1% solution, according to the MSDS.

A total of four tests were conducted using the MES 10 formulation. The first test was the baseline without the addition of fibrous material. The second test was the addition of two weight percent bleached paper fibers obtained from SCA North America's plant located in Barton, Ala. The third test was the addition of two weight percent Brownstock wood pulp, 0.5 mm sieve. The fourth test was the addition of two weight percent CoosAbsorb 9E8 fluff pulp 0.5 mm sieve. Both the Brownstock and CoosAbsorb materials were samples available from Bowater, now Abitibibowater.

Example 1

Bench Top

Preparation of Test Product

Each of the four compositions was produced using pilot plant conditions on the bench in a pan granulator. The test products were generally produced by first charging a granulator with elemental sulfur dust and recycle fines of MAP followed by the distribution of a pre-neutralized slurry (pH—2.4-2.6) composed of ammonium sulfate, fibrous material (in the three test samples), and 40% $P_2O_5$ phosphoric acid onto the rolling bed of the granulator. The material was then injected with anhydrous ammonia using a gas sparger until a product pH of about 4.2 was achieved. The resulting products comprises about five weight percent elemental sulfur and about five weight percent sulfate sulfur in a MAP-based formulation. The baseline product was also produced in a similar manner, but without inclusion of the fibrous material in the pre-neutralized slurry.

More particularly, approximately two pounds of granular product for each test product was produced in two batches. The first batch used MAP in the form of MES10 supplied by MOS Holdings, Inc. as the starting bed material in the lab pan to simulate recycle in a continuous operation. The level of any additives was adjusted to account for the amount of MAP used. The second batch of slurry was granulated using the undersize and ground oversize from the first initial batch in place of the MAP.

The first step in preparing each batch of each test sample was the pre-neutralizer step in which the pre-neutralizer slurry was prepared. The 40% $P_2O_5$ acid was weighed into a 1000 mL beaker. The beaker was placed on a hotplate/stirrer. A stir-bar was placed in the beaker. The heat and stirrer were turned on. The ammonium sulfate was then weighed into a beaker. The pre-weighed amount of ammonium sulfate was added to the 40% $P_2O_5$ acid while stirring. The mixture was heated to 200° F., monitored by a handheld thermocouple equipped with a probe placed in the beaker. At 200° F., the fibrous material was added and allowed to stir until dispersed, with the exception of the baseline product which contained no fibrous material.

Once the fibrous material was well mixed, the ammonia sparger was turned on and lowered into the solution using a ⅜" stainless steel tube sparger for a controlled metering of the gas. The sparger was attached to an ammonia cylinder with a regulator and needle valve. The ammonia was charged to the slurry while stirring continued. The pH of the slurry was checked intermittently using a lab bench top pH meter and probe until the slurry pH reached about 2.4-2.5. At that point, the ammonia sparger was removed from the solution and turned off. The partially ammoniated solution was then transferred to a pan granulator during the granulation process described below.

The pan granulator was a laboratory pan granulator that was 20 inches in diameter and three inches in depth. The pan was tilted 50 degrees from the horizontal. The pan speed was controlled by a ⅓ HP Baldor motor with a variable speed motor controller.

In the granulation/final ammoniation step, the MAP or ground oversize and undersize was added to the pan granulator. The powdered sulfur was weighed out in a beaker and added to the pan granulator. The pan granulator was turned on and the bed was allowed to mix well. The pre-neutralizer slurry prepared above was then slowly poured over the rolling bed. The ammonia sparger was turned on and placed in the bed of material. As the bed began to dry, the bed was worked into granules by hand. The ammonia was continued until the bed was free-flowing, at which time the pH was checked.

If the pH was above 4.2, the ammonia sparger was removed from the bed and turned off, and if it was below 4.2, the ammonia was continued and the pH rechecked until it was above 4.2. Once the pH was above 4.2, the material was removed from the pan granulator and placed in a laboratory convection oven at 120° F. to dry overnight. Upon drying, it was screened by hand to separate the product size, oversize, and undersize. The sieves used were a 5 Tyler mesh and a 9 Tyler mesh. The product size granules were about 2.0-4.0 mm in diameter. The oversize, undersize, and product for each test were placed in individually labeled sample bags.

Results

In Test #1, the baseline MES10 formulation was granulated in the pan granulator. The pre-neutralizer step operated as expected. As the temperature approached 240° F. during ammoniation, there was foaming from the boiling reaction. The pH of the pre-neutralizer slurry was approximately 2.4. When the pre-neutralizer slurry was poured onto the rolling bed in the pan granulator, the bed became wet. The bed dried up when the final ammoniation was completed. The pH of the bed material after final ammoniation was 4.2. The granules were similar in size and appearance to the commercial MES 10 product produced in the pilot plant. The appearance of individual granules is shown in the photograph of FIG. 1.

The first batch of Test #1, prepared using MAP included the following components, prepared as described above: 500 grams MAP; 483 grams 40% $P_2O_5$ acid; 206 grams ammonium sulfate; and 55.5 grams powdered elemental sulfur. The second batch included 480 grams oversize and undersize from the first batch; 483 grams 40% $P_2O_5$ acid; 104 grams ammonium sulfate; and 25 grams powdered elemental sulfur.

In Test #2, about two weight percent bleached paper fibers were added to the MES10 formulation. The bleached paper fibers were available in large, damp clumps. The paper fibers were placed in a food processor and worked into small pieces. The moisture was checked on the paper fibers after the food processor, which was about 42.3 weight percent water. This level of moisture was taken into account in the formulation to obtain about 2 weight percent fibers on a dry basis.

Figure 2:
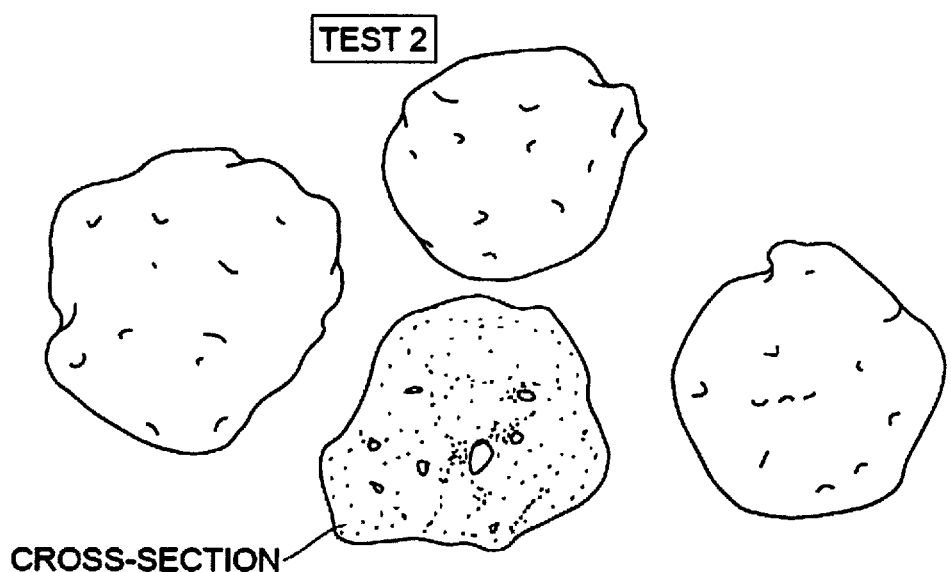
FIG. 2 is a photograph of granules of the baseline product with two weight percent bleached paper fibers.

When the paper fibers were added in the pre-neutralizer step at 200° F., there was substantial foaming to the top of the beaker. The foaming continued during the ammoniation in the pre-neutralizer. The pH of the pre-neutralizer slurry was about 2.5. When the pre-neutralizer slurry was poured on to the rolling bed in the pan granulator, the bed became wet. The bed dried up when the final ammoniation was completed. The pH of the bed material after final ammoniation was about 5.8. The resulting granules were similar in size and appearance to the product produced in the pilot plant. The appearance of individual granules is shown in the photograph of FIG. 2.

The first batch of Test #2, prepared using MAP included the following components, prepared as described above: 500 grams MAP; 470 grams 40% $P_2O_5$ acid; 207.1 grams ammonium sulfate; 56 grams powdered elemental sulfur; and 31.4 grams bleached paper fiber @ 42.3% moisture (approximately 18.1 grams dry basis). The second batch included 510 grams oversize and undersize from the first batch; 470 grams 40% $P_2O_5$ acid; 104 grams ammonium sulfate; 25 grams powdered elemental sulfur; 17.4 grams bleached paper fiber @ 42.3% moisture (10 grams dry basis).

Figure 3:
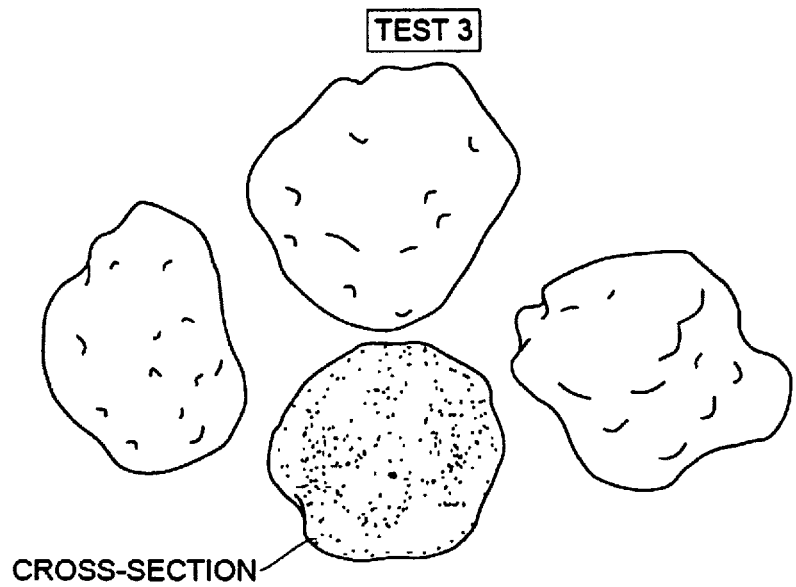
FIG. 3 is a photograph of granules of the baseline product with two weight percent Brownstock 0.5 mm sieve fibers.
Figure 4:
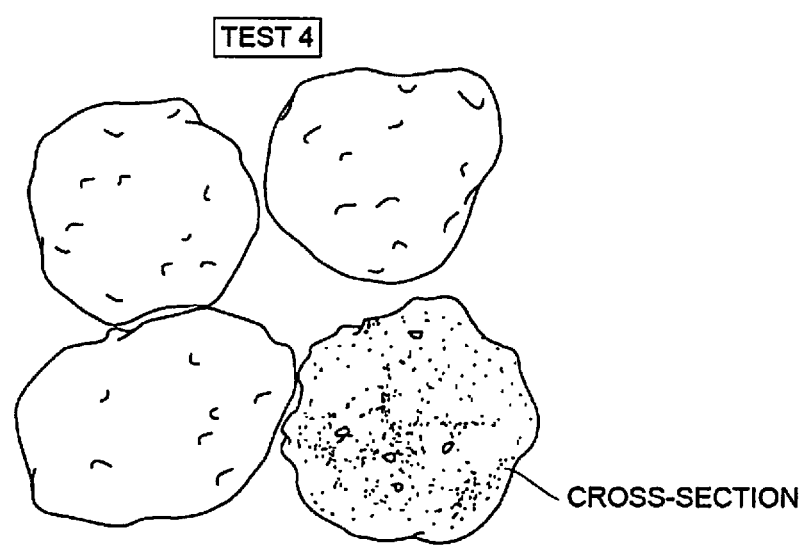
FIG. 4 is a photograph of granules of the baseline product with two weight percent CoosAbsorb 9E8 fluff pulp 0.5 mm sieve.

In Test #3, about two weight percent Brownstock 0.5 mm sieve fibers were added to the MES10 formulation. There was no foaming when the Brownstock was added to the pre-neutralizer at 200° F. The fibers seemed to disperse into the slurry. There were also no foaming issues during the ammoniation in the pre-neutralizer. The pH of the pre-neutralizer was about 2.4. When the pre-neutralizer slurry was poured on to the rolling bed in the pan granulator, the bed became wet. The bed dried up when the final ammoniation was completed. The pH of the bed material after final ammoniation was 4.2. The granules were smaller in size and more irregular in appearance than product produced in the pilot plant. The appearance of individual granules is shown in the photograph of FIG. 3.

The first batch of Test #3, prepared using MAP included the following components, prepared as described above: 500 grams MAP; 470 grams 40% $P_2O_5$ acid; 207.1 grams ammonium sulfate; 56 grams powdered elemental sulfur; 18.1 grams Brownstock 0.5 mm sieve. The second batch included 622 grams oversize and undersize from the first batch; 470 grams 40% $P_2O_5$ acid; 104 grams ammonium sulfate; 25 grams powdered elemental sulfur; and 10 grams Brownstock 0.5 mm sieve.

In Test #4, about two weight percent CoosAbsorb 9E8 0.5 mm sieve was added to the MES10 formulation. There was no foaming when the CoosAbsorb was added to the pre-neutralizer at 200° F. The fibers seemed to disperse into the slurry. There were no foaming issues during the ammoniation in the pre-neutralizer. The pH of the pre-neutralizer slurry was about 2.4. When the pre-neutralizer slurry was poured on to the rolling bed in the pan granulator, the bed became wet. The bed dried up when the final ammoniation was completed the pH of the bed material after final ammoniation was about 5.5. The granules were smaller in size and more irregular in appearance than product produced in the pilot plant.

The first batch of Test #4, prepared using MAP included the following components, prepared as described above: 500 grams MAP; 470 grams 40% $P_2O_5$ acid; 207.1 grams ammonium sulfate; 56 grams powdered elemental sulfur; 18.1 grams CoosAbsorb 9E8 0.5 mm sieve. The second batch included 820 grams oversize and undersize from the first batch; 470 grams 40% $P_2O_5$ acid; 104 grams ammonium sulfate; 25 grams powdered elemental sulfur; and 10 grams CoosAbsorb 9E8 0.5 mm sieve.

Example 2

Pilot Plant

Sample Preparation

During pilot plant preparation of MES 10, material similar to Test #2 was prepared by the addition of paper fiber such that the paper fiber was about two weight % of the final product. The product was examined to determine if it provided additional stability to the product, to prove the results from earlier pan granulation tests. Particularly, waste paper fiber from a recycling plant (49% moisture; normally land filled) was obtained, milled with a hammer mill, and screened to remove any unwanted materials, such as oversize, needle parts, rubber, etc. These paper fibers can react violently with phosacid, thereby frothing excessively, which can in turn cause problems with pumping including pump cavitation and plugging of slurry lines. Therefore, the paper fibers were added as a water slurry to the granulator at a location near where partially ammoniated phosacid slurry is sprayed.

Due to the thixotropic nature of this paper fiber, the maximum pumpable slurry (using available pumps at the pilot plant) was ~10 wt % on a dry solids basis. For the first two tests, the paper fiber was added as a slurry. Process adjustments were needed for both of these tests because the additional water from this slurry markedly upset the water balance of this small pilot plant (rate of 400 lb/hr), resulting in over-granulation followed by overloading of the oversize mill (chain mill) with resultant equipment failure.

The heel for the first test was MES10 while the heel for the second test was material remaining from the previous test to more closely approach equilibrium. For the second test, the run was interrupted several times due to over-granulation to grind down oversize product because the mill could not keep up with the large amount of oversize.

A third run examined the addition of the fiber solids as is, not in a slurry, directly to the recycle chute into the front of the granulator.

Results

Visual

Observations of analytical tests for elemental sulfur indicated that for the first two tests wherein the fiber was added as a water slurry, the fiber was incorporated into the elemental sulfur of the MES10, producing a dark grey color. For the third test, i.e. direct addition of fiber, the elemental sulfur was its usual bright yellow with black specks, presumably clumps of the fibers.

Production

The addition of fiber as a slurry provides a preferable result, assuming adequate pumping capability is available. The fiber content can be increased to higher concentrations with sufficient pumping capability, for example, in a larger plant.

Dust Testing

Evaluation of long term dust generation with temperature cycling indicates a reduction of from about 20 to about 100% by using fiber treatment (as a slurry) compared to the baseline MES10 material, more particularly about 50% or more reduction, and more particularly about 52% or more reduction.

Persons of ordinary skill in the relevant arts will recognize that the invention may comprise more or fewer features than illustrated in any individual embodiment described above. The embodiments described herein are not meant to be an exhaustive presentation of the ways in which the various features of the invention may be formed or combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A granulated phosphate fertilizer product comprising a plurality of phosphate fertilizer granules having enhanced particle integrity, the fertilizer granules comprising:
a phosphate base material portion;

at least one nutrient selected from a group consisting of a micronutrient, a secondary nutrient, and combinations thereof embedded within the phosphate material portion; and a fibrous material embedded within the phosphate material portion, wherein the fertilizer granules are formed by a process comprising preparing a pre-neutralized slurry, the pre-neutralized slurry being prepared by combining ammonia, phosphoric acid, and fibrous material to produce a partially ammoniated slurry, supplying the partially ammoniated slurry to a granulator, and adding ammonia to the granulator to complete formation of the phosphate fertilizer granules including fibrous materials.

2. The fertilizer product of claim 1, wherein the phosphate base material comprises monoammonium phosphate, diammonium phosphate, or combinations thereof.

3. The fertilizer product of claim 1, wherein the fertilizer granules comprise at least one micronutrient selected from a group consisting of boron (B), copper (Cu), iron (Fe), manganese (Mn), molybdenum (Mo), zinc (Zn), chlorine (Cl), cobalt (Co), sodium (Na), and combinations thereof.

4. The fertilizer product of claim 1, wherein the fertilizer granules comprise at least one secondary nutrient selected from a group consisting of calcium (Ca), sulfur (S), magnesium (Mg), and combinations thereof.

5. The fertilizer product of claim 4, wherein the at least one secondary nutrient comprises sulfur, and wherein the sulfur is available in a form chosen from elemental sulfur and a sulfate.

6. The fertilizer product of claim 1, wherein the fibrous material comprises cellulosic fibers from pulp or paper sludge, vegetable fibers from sugar beet, sugar cane, citrus pulp, grain, and/or potato, wood flour, peat moss, composted organic materials, manures, cotton, straw, brewers condensed solubles, lignosulfonate, sodium carbonate lignin, cane molasses, beet syrup, beet molasses, whey starch, soy solubles, corn cob, rice hulls, peanut hulls, ground wheat straw flour, wheat flour, soy flour, cellulose derivates, cellulose-based polymer binders, seed meal, feather meal, soy meal, humic acid, animal waste, activated sludge, hydrolyzed animal hair, or combinations thereof.

7. The fertilizer product of claim 6, wherein the fibrous material comprises fibers from pulp or paper sludge.

8. The fertilizer product of claim 1, wherein the fibrous material is present in an amount from about 0.1 to about 10 weight percent of each fertilizer granule.

9. The fertilizer product of claim 1, wherein the fibrous material is present in an amount from about 0.5 to about 3 weight percent of each fertilizer granule.

10. A method of producing phosphate fertilizer granules including fibrous material to enhance particle integrity, the method comprising:

preparing a pre-neutralized slurry containing a source of sulfur, the pre-neutralized slurry being prepared by combining ammonium sulfate, phosphoric acid, and fibrous material to form a partially ammoniated composition;

supplying the partially ammoniated composition to a granulator; and adding ammonia to the granulator to complete formation of the phosphate fertilizer granules including a phosphate fertilizer portion and the fibrous material embedded within the phosphate fertilizer portion.

11. The method of claim 10, wherein charging the pre-neutralized slurry includes adding ammonia until a pH of the slurry reaches about 2.4 to about 2.6.

12. The method of claim 10, wherein adding ammonia to the granular includes adding ammonia until a pH of the fertilizer granules reaches about 4.2.

13. The method of claim 10, wherein the phosphoric acid comprises a 40% $P_2O_5$ phosphoric acid.

14. The method of claim 10, wherein the pre-neutralized slurry comprises one or more micronutrients.

15. The method of claim 14, wherein the one or more micronutrients are selected from a group consisting of boron (B), copper (Cu), iron (Fe), manganese (Mn), molybdenum (Mo), zinc (Zn), chlorine (Cl), cobalt (Co), sodium (Na), and combinations thereof.

16. The method of claim 10, wherein the fertilizer comprises one or more additional secondary nutrients selected from a group consisting of calcium (Ca), additional sulfur (S), magnesium (Mg), and combinations thereof.

17. The method of claim 16, further comprising spraying elemental sulfur on the phosphate fertilizer granules in the granulator.

18. The method of claim 10, wherein the fibrous material comprises cellulosic fibers from pulp or paper sludge, vegetable fibers from sugar beet, sugar cane, citrus pulp, grain, and/or potato, wood flour, peat moss, composted organic materials, manures, cotton, straw, brewers condensed solubles, lignosulfonate, sodium carbonate lignin, cane molasses, beet syrup, beet molasses, whey starch, soy solubles, corn cob, rice hulls, peanut hulls, ground wheat straw flour, wheat flour, soy flour, cellulose derivates, cellulose-based polymer binders, seed meal, feather meal, soy meal, humic acid, animal waste, activated sludge, hydrolyzed animal hair, or combinations thereof.

19. The method of claim 18, wherein the fibrous material comprises fibers from pulp or paper sludge.

20. The method of claim 10, wherein the fibrous material is present in an amount from about 0.1 to about 10 weight percent of the fertilizer granule.

* * * * *